United States Patent [19]

Anzai et al.

[11] Patent Number: 5,179,546

[45] Date of Patent: Jan. 12, 1993

[54] MAGNETO-OPTICAL DISK AND PROCESS FOR MANUFACTURING THE SAME

[75] Inventors: Yumiko Anzai, Tachikawa; Yoshinori Miyamura, Nishitama; Toshio Niihara, Sayama; Harukazu Miyamoto, Hachioji; Norio Ohta, Kitasoma, all of Japan

[73] Assignees: Hitachi, Ltd., Tokyo; Hitachi Maxwell, Ltd., Osaka, both of Japan

[21] Appl. No.: 631,984

[22] Filed: Dec. 21, 1990

[30] Foreign Application Priority Data

Dec. 27, 1989 [JP] Japan .................. 1-339245

[51] Int. Cl.$^5$ ................ G11B 7/24; G11B 3/70
[52] U.S. Cl. .................. 369/275.1; 369/275.5; 369/283; 264/1.3; 264/1.4; 264/2.5
[58] Field of Search ............ 369/275.1, 275.2, 275.3, 369/275.4, 283, 284, 286, 13; 360/59, 114, 103, 135; 264/1.3, 1.4, 2.5

[56] References Cited

U.S. PATENT DOCUMENTS

| | | |
|---|---|---|
| 4,668,550 | 5/1987 | Tajima et al. ............ 369/286 |
| 4,707,431 | 11/1987 | Umehara ................. 369/275.1 |
| 4,729,938 | 3/1988 | Tajima et al. ........... 369/275.1 |
| 4,734,810 | 3/1988 | Nakayama et al. ....... 360/131 |
| 4,889,757 | 12/1989 | Horigome et al. ........ 369/283 |
| 4,939,603 | 7/1990 | Inumochi ................ 360/103 |
| 4,947,384 | 8/1990 | Suzuki et al. ........... 369/275.1 |
| 4,985,881 | 1/1991 | Saito et al. ............. 369/13 |

FOREIGN PATENT DOCUMENTS 0113452 4/1990 Japan .................. 369/283

OTHER PUBLICATIONS

"Magneto-Optical Recording Characteristic of TbFeCo Media by Magnetic Field Modulation Method", Japanese Journal of Applied Physics, vol. 26, No. 2, Feb. 1987, pp. 231-235, Fujio Tanaka.

Primary Examiner—John W. Shepperd
Assistant Examiner—Tan Nguyen
Attorney, Agent, or Firm—Antonelli, Terry, Stout & Kraus

[57] ABSTRACT

A magneto-optical disk which has a circular disk form and comprises a substrate provided with information pits and a guide groove, a recording medium layer provided on the substrate, and a protective layer formed of at least one thin film on the medium layer, in which the surface of the protective layer is minutely roughened to have a concave rough pattern and not to substantially protrude beyond a reference level composed of the outermost surface portions of the protective layer. When the magneto-optical disk is subjected to recording by a CSS system using an air floating magnetic head conforming to high-frequency recording in a magnetic field modulation type recording, which is one of methods of overwrite recording on magneto-optical disks, the minute concave rough pattern formed on the surface of the disk substrate prevents such troubles as adhesion of the magnetic head to the surface of the disk and collision between the disk substrate being rotated and the head.

8 Claims, 4 Drawing Sheets

MAGNETO-OPTICAL DISK AND PROCESS FOR MANUFACTURING THE SAME

BACKGROUND OF THE INVENTION

This invention relates to a wear-resisting protective layer of a magnetic field modulation type magneto-optical disk, and more particularly to a structure of magneto-optical disk which is suitable for obviating the collision, adhesion or the like between a rotating disk and a magnetic head having an air floating function.

The conventional magnetic field modulation type optical disks have been said to be capable of overwrite recording if a magneto-optical film having an easy axis of magnetization in the perpendicular direction is formed on a recording surface of a disk and the direction of magnetization in a region irradiated with a laser beam is controlled easily and at high speed by applying a magnetic field thereto, as discussed in Japanese Journal of Applied Physics, Vol. 26 (1987), pp. 231-235.

In the example mentioned above, however, a modulated magnetic field has been applied by a field generating electromagnetic coil located at a distance of 0.1 to 0.5 mm upward from the disk. With such an arrangement, the recording frequency has been less than 0.5 MHz and it has been impossible to record signals at a high frequency on the order of several megahertz or above.

In view of the above, an overwriting method based on the so-called contact start stop system (hereinafter referred to "CSS system") has been developed in which an optical head and a magnetic head are opposed to each other, with a magnetic field modulation type disk interposed therebetween, and in which an air floating magnetic head is used as the magnetic head. Recording of signals is carried out by irradiating the magnetic field modulation type recording film with a high-output laser beam from substrate side by use of the optical head, and, at the same time, applying a modulated magnetic filed with inversion of polarity according to the signals by the magnetic head, to the disk from the recording film side. By this method, old signals can be overwritten with new signals.

However, in carrying out the CSS system, there has occurred the problem that, as shown in FIG. 2, the disk surface and the magnetic head 8 are liable to undergo wear, marring or the like due to contact wear while the disk is not rotated or when the rotation is started or stopped. In order to prevent such troubles, a method of making the disk surface rougher than the surface of the magnetic head has been proposed. Roughening the surface is carried out by, for example, grinding the surface into a rough state. In this case, the magnetic disks are subjected to grinding, one by one, after the formation of the protective layer. The grinding operation is troublesome and leads to the fatal problem of generation of dust. In addition, a mistake in the grinding operation or the like would damage the recording film beneath the protective layer. To obviate the difficulties, a method has been proposed in which an uneven surface pattern is preliminarily imparted to the surface of a transparent substrate by the above-mentioned method, and the substrate with the surface pattern is used as a mother mold for replication of the pattern by use of a UV light curable resin or the like. In this case, the rough pattern on the surface of the mother mold is a concave pattern, so that the rough pattern formed on the surface of the protective layer of the disk through replication is a convex pattern, as shown in FIG. 3.

Thus, the rough patterns of the disk surface obtained by the prior art would sometimes be irregular convex patterns, as shown in FIG. 3. In such a situation, the magnetic head would collide against the protrusions of the rough pattern, thereby being easily worn or marred or resulting in the generation of dust.

As a countermeasure against these problems, control of the depth of surface roughness of the mother mold to obtain a uniform depth of roughness has been proposed. This approach, however, has the problem that the manufacturing method and the processing method are difficult to carry out and the reliability thereof is low.

Furthermore, as the revolving speed of the disk is increased in correspondence with an increase in recording capacity, there also arises the possibility of the head being broken due to collision on the above-mentioned protrusions.

Besides, in FIGS. 2 and 3, numeral 6 denotes a substrate with a recording film, 7 denotes a protective layer, and 10 denotes a reference level.

SUMMARY OF THE INVENTION

This invention contemplates a solution to the above-mentioned problems involved in the prior art.

It is accordingly an object of this invention to enable recording of signals at a frequency of several megahertz by use of a magnetic field modulation type magneto-optical disk, and to provide efficiently and stably a medium capable of overwrite recording by a stable CSS system for achieving the signal recording at the high frequency.

In order to attain the above object, according to this invention the surface of a protective layer for protection of the surface of a recording film is minutely roughened to have a concave rough pattern and not to substantially protrude beyond a reference level composed of the outermost surface portions of the protective layer.

The "reference level" means that the protective layer has a substantially flat surface between the concave portions of the rough pattern.

In addition, the surface roughness of the protective layer is preferably made to be greater than the surface roughness of the magnetic head used. That is to say, it is preferable to enlarge the average of maximum surface roughness over unit area of the protective layer (The term "maximum surface roughness" means the vertical distance between the highest crest and the deepest trough in the uneven rough pattern of the relevant surface.) By such an arrangement, the contact area between the surface of the magnetic head and the surface of the protective layer is reduced, whereby the adhesion of the head to the protective layer can be prevented. As a material for the protective layer, there can be used a UV light curable resins, a thermosetting resin or an anaerobic adhesive, or a combination thereof. The term "anaerobic adhesive" means a resin which cures in an atmosphere where oxygen is absent.

This invention can be carried out by use of a casting method, which involves a low manufacturing cost. That is, a surface of a transparent substrate is preliminarily ground roughly to be a rough surface (at this point, the surface pattern is a concave pattern relative to the reference level composed of the outermost surface portions of the substrate), and the substrate with the roughened surface is used as a mother mold for replication of the surface pattern by use of the above-mentioned resin, thereby making a stamper. The stamper thus obtained has a surface roughened in a convex pattern. Therefore, when a protective layer of a disk is formed by the 2P (Photo-Polymerization) technique using the stamper, the surface of the resulting protective layer appears roughened entirely in a concave pattern, with no irregular protrusions.

The surface of the protective layer thus obtained is apparently flat and devoid of protrusions, so that the above-mentioned problems will not occur even when the magnetic head comes into contact (or moves in contact) with the surface of the protective layer.

It is known that adhesion of a magnetic head to an opposed surface hardly occurs when the surface roughness of the opposed surface is greater than the surface roughness of the head, and that the adhesion can be restrained by reducing the contact area between the head surface and the opposed surface.

It can be said that the adhesion of the magnetic head to the opposed surface can be obviated if the opposed surface is not a perfectly flat surface; thus, the rough pattern of the opposed surface may be either convex or concave, in order to prevent the adhesion, provided that the opposed surface is not a perfectly flat surface. In view of this, the rough pattern of the surface opposed to the magnetic head has been made to be a concave pattern which is uniform over the whole area of the surface. This structure precludes collision of the magnetic head against protrusions on the opposed surface, thereby preventing the breakage of the head or the generation of dust and enabling stable recording and reproduction.

DETAILED DESCRIPTION OF THE PREFERRED EMBODIMENT

EXAMPLE 1

Referring to Figs. 1a to 1e, there is illustrated an embodiment of a process for manufacturing a protective layer of a magneto-optical disk according to this invention. First, in order to make a mother mold 1, one side of a transparent substrate 1.0 to 2.0 mm thick is roughened uniformly by sandpaper or abrasive grains (grain diameter: from 1 $\mu$m up to 5 $\mu$m). The suitable range of the kind of the sandpaper is from 600 Cw to 240 Cw.

Figure 1A:
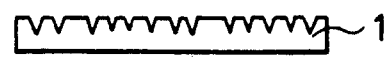
Figs. 1a to 1e are sectional views illustrating the steps of a process for manufacturing a magneto-optical disk according to a casting method described in Example 1 of this invention.

The surface of the mother mold 1 thus obtained has a concave rough pattern as shown in FIG. 1a.

Figure 1B:
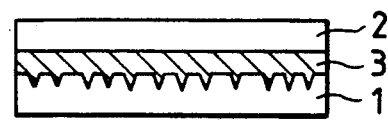
Figure 1C:
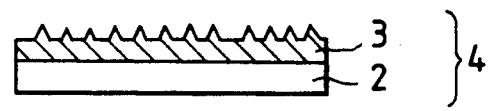

Next, a casting method is carried out based on the mother mold 1 made as above, thereby forming a stamper 4. More specifically, as shown in FIG. 1b, a UV light curable resin 3 is dropped onto a transparent substrate 2, and the substrate 2 is superposed, in a face-down condition, on the mother mold 1 provided with the concave pattern. A load of at least 10 kg is exerted on the whole surface of the transparent substrate 2, thereby pressing the UV light curable resin 3 to spread uniformly to a small thickness of about 20 $\mu$m, followed by irradiating the resin 3 with UV light 5 for 15 to 20 seconds to cure the resin 3. Thereafter, the mother mold 1 is removed, thereby obtaining the stamper 4 having a surface provided with a convex pattern duplicated faithfully from the concave pattern of the surface of the mother mold 1, as shown in FIG. 1c.

Figure 1D:
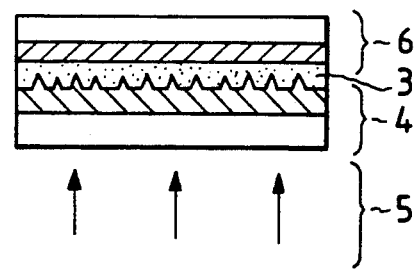
Figure 1E:
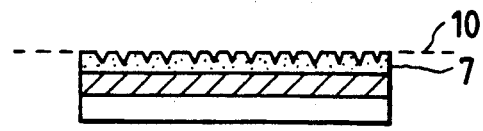
Figure 2:
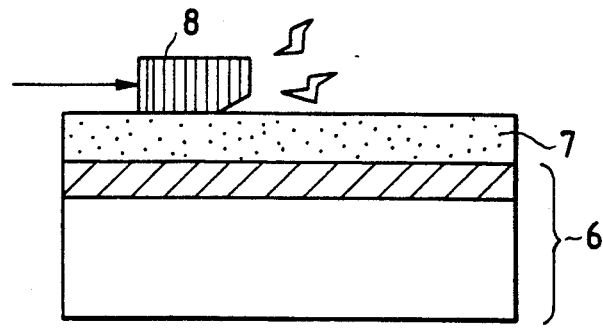
FIGS. 2 and 3 are each a sectional view showing the structure of a magnetic field modulation type disk according to the prior art.
Figure 3:
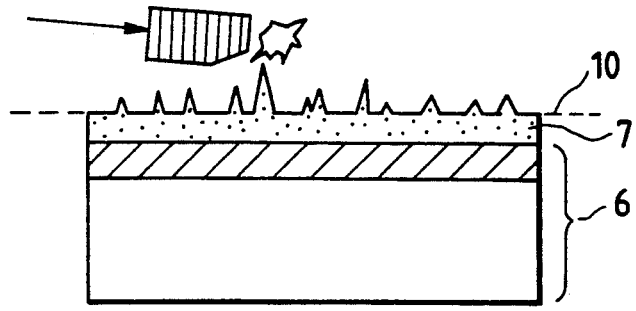

Finally, as shown in FIG. 1d, a casting method using a UV light curable resin is similarly carried out by use of the stamper 4 obtained above. By this operation, a protective layer 7 having a concave pattern at the surface thereof is formed on a substrate with recording film 6, as shown in FIG. 1e. When recording based on the CSS system was carried out by bringing the magnetic head into contact with the surface provided with the concave pattern as above, adhesion of the head to the surface did not occur. In FIG. 1e, numeral 10 denotes the reference level.

Besides, the protective layer can be also formed by use of a thermosetting resin or an anaerobic adhesive, instead of the UV light curable resin. As the resin for forming the protective layer, there can be mentioned trimethylolpropane triacrylate, trimethylolpropane trimethacrylate, pentaerythritol triacrylate, pentaerythritol trimethacrylate, 1,3,5-tris(Bacryloyloxyethyl) isocyanurate, 1,3,5-tris(Bmethacryloyloxyethyl) isocyanurate, pentaerythritol tetramethacrylate, dipentaerythritol pentaacrylate, dipentaerythritol hexaacrylate, dipentaerythritol hexamethacrylate, dipentaerythritol hexa($\omega$-acryloyloxy-$\epsilon$-caproate), dipentaerythritol hexa($\omega$-methacryloyloxy-$\epsilon$-caproate), etc., which may be used either singly or in combination. Simultaneously with these monomers, other monomers can be used together.

As to an initiator, there are no restrictions. Examples of the initiator which can be used include benzophenone, $\theta$-carbomethoxybenzophenone, 4,4'-dichlorobenzophenone, 4,4'-dimethylaminobenzophenone, 4,4'-diethylaminobenzophenone, acetophenone benzyl, benzoin, benzoin isopropyl ether, benzyl dimethyl acetal, 1,1-dimethoxyacetophenone, 2-ethylanthraquinone, 2-tbutylanthraquinone, 2-fluorothioxanthone, 2,4-diethylthioxanthone, 2,4-diisopropylthioxanthone, etc., which may be used either singly or in combination. In addition to the initiator, compounds assisting the initiator may be used. As the compounds assisting the initiator which can be used include tertiary amines such as dimethylethanolamine, triethanolamine, p-dimethylaminobenzoic alkyl ester, etc., mercaptane derivatives, and so on.

As the anaerobic adhesive, there can be mentioned a mixture obtained by mixing tetraethylene glycol dimethacrylate, trimethylolpropane trimethacrylate, epoxy dimethacrylate or the like and cumene hydroperoxide with a polymerization inhibitor.

EXAMPLE 2

Although only one protective layer is provided in Example 1, the same effect as that in Example 1 can be obtained when two or more protective layers are provided.

Figure 4A:
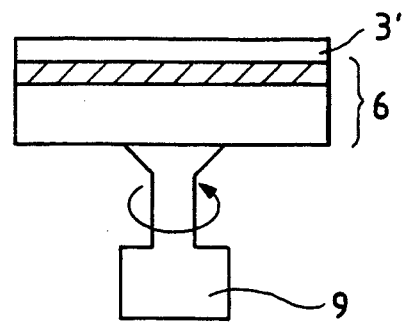
FIGS. 4a to 4d are sectional views illustrating the steps of a process for manufacturing a magneto-optical disk described in Example 2 of this invention.
Figure 4B:
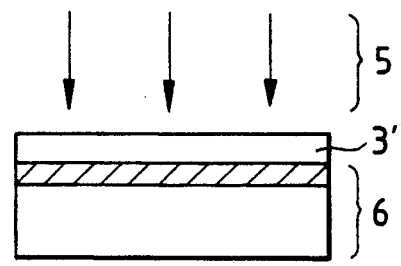
Figure 4C:
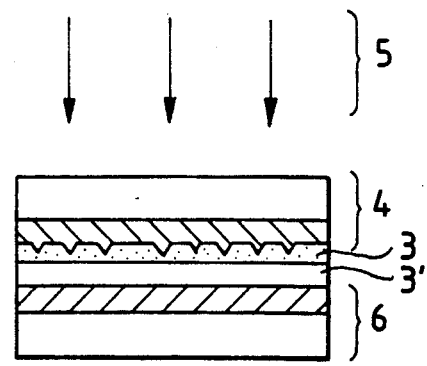
Figure 4D:
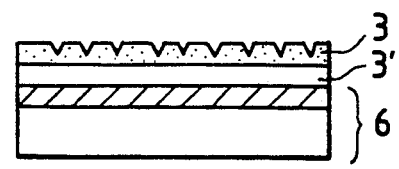

As shown in FIG. 4a, a substrate with magneto-optical recording film 6 is attached to a revolving stand 9. A UV light curable resin 3' having a property for good adhesion to the recording film, for instance, R6602 (a product by Japan Synthetic Rubber Co., Ltd.) is applied to the recording film in a concentric circular pattern. The revolving stand 9 is started slowly, and after the resin 3' is confirmed to have spread over the entire surface area of the recording film, the revolving stand 9 is accelerated to a revolving frequency of at least 1000 rpm, thereby causing the resin 3' to become a uniform thin film. After confirmation of the absence of dust or impurities adhered to the surface of the thin film of the resin 3', the thin film is irradiated with UV light 5 (FIG. 4b). The duration of irradiation with the UV light 5 is set within the range of up to half the period required for complete cure of the resin (for instance, within the range of 1 to 5 seconds), thereby curing the resin 3 incompletely. Thereafter, as shown in FIG. 4c, a resin (one with a high hardness, for instance, UV-3701, a product by Toa Gosei Chemical Ind. Co., Ltd.) 3 is further dropped evenly to several positions on the incompletely cured resin 3'. A stamper 4 having a surface provided with a convex pattern is superposed, in a face-down condition, on the disk substrate with recording film 6 provided with the resin layer 3'. Then, a load of at least 10 kg is exerted from the back side of the disk substrate 6 to press the resin 3 to spread, followed by irradiation with UV light 5 to cure the resin 3. Subsequently, as shown in FIG. 4d, the stamper 4 is removed, whereby a protective layer 7 having a surface provided with a concave pattern, similar to that in Example 1, is formed on the disk substrate with recording film. When the magneto-optical recording disk provided with the protective layer 7 as above was put to recording based on the CSS system, adhesion of the magnetic head to the surface of the protective surface did not occur.

In the case of providing three or four protective layers by a process similar to the above, the casting method using a stamper having a convex rough pattern at the surface thereof should be carried out only in the formation of at least the outermost resin layer.

EXAMPLE 3

The method of roughening a surface into a concave pattern in making the mother mold 1 for forming the protective layer is not limited to the grinding with a sandpaper explained in Example 1. A method in which the surface is dissolved by use of hydrofluoric acid may also be used for this purpose.

Hydrofluoric acid is poured into an acid-proof vessel, to a depth of at least 1 cm. A transparent substrate 2 to become a stamper 4 is immersed in the hydrofluoric acid; in this case, to bring at least one side of the substrate 2 into contact with the hydrofluoric acid, a protective tape or the like is adhered to the other side. After about 5 minutes of immersion, the transparent substrate 2 is taken out of the hydrofluoric acid. Consequently, the surface on at least one side of the substrate 2 is dissolved, resulting in the formation of a mother mold 1 having a minute uneven surface pattern.

Thereafter, the procedure explained in Examples 1 and 2 is followed, whereby a protective layer with a concave surface pattern is formed on the substrate with recording film. The protective layer thus obtained, like those obtained in the above examples, was free of the problems of adhesion of the magnetic head thereto or collision of the head thereon during rotation of the disk.

EXAMPLE 4

For making the mother mold 1 to be used for forming the protective layer, a sputter etching method can also be used, in place of the methods explained in Examples 1 and 3.

A transparent substrate to become a mother mold 1 is set in a vacuum, and sputter etching is applied to a surface of the substrate. A power of at least 100 to 200 W is required for the sputter etching, with a CF4 gas pressure being about $1 \times 10^{-2}$ Torr. The sputtering is carried out for at least 10 minutes.

When the substrate is heated during the sputter etching, a more efficient etching can be achieved.

The surface of the substrate prepared in this manner can have a minute concave pattern, produced by the long-time sputter etching at high power.

Thereafter, the procedure described in Examples 1 and 2 is followed, whereby a protective layer having the same effect as those in the above examples can be formed.

EXAMPLE 5

As a further example of the method of making the mother mold 1, a method in which sand grains are blown at a high pressure to a glass substrate for forming a mother mold (a sand-frosting method) will now be explained below.

Sand grains with a grain diameter of several micrometers are blown to a flat glass substrate at a high pressure for about 3 minutes, whereby the surface of the substrate is ground by the sand grains to have a concave rough pattern, with the depth of the concave portions being several micrometers.

When the thus obtained mother mold was used to form a protective layer of a magneto-optical disk similarly to the above examples, the surface of the protective layer obtained was free of the problems of adhesion of the magnetic head thereto or collision of the head against the disk during recording based on the CSS system.

Figure 5:
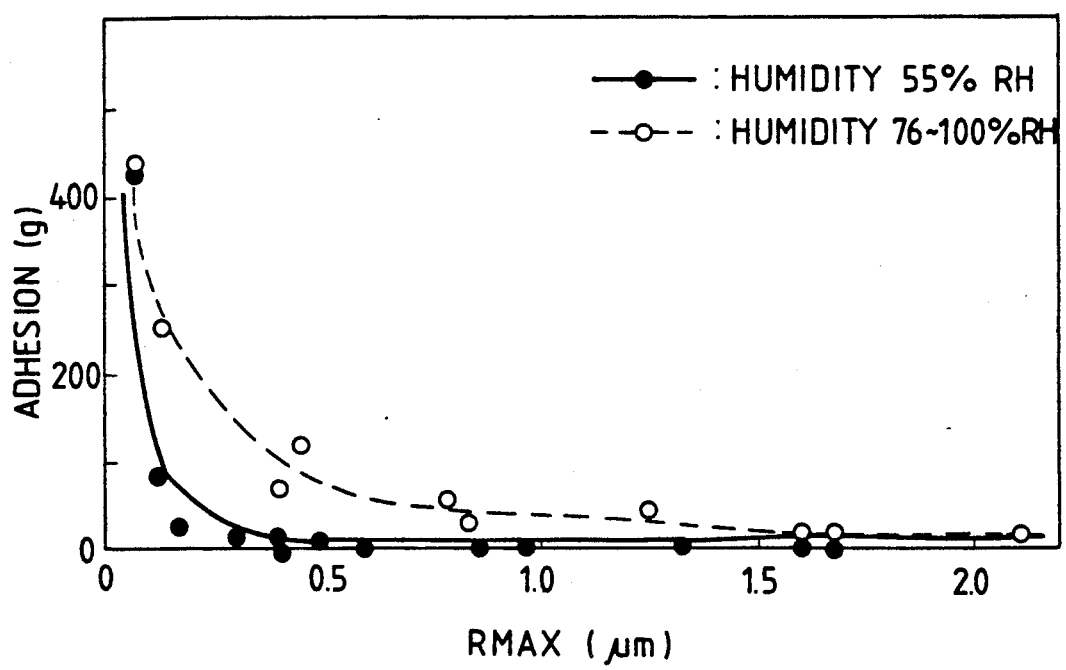
FIG. 5 is a characteristic diagram showing the measurement results of adhesion of a magnetic head to a protective layer of a magneto-optical disk, plotted against the surface roughness of the protective layer.

The relationship between the maximum surface roughness ($R_{MAX}$) of the surfaces of the protective layers formed as described in Examples 1 to 5 and the adhesion of the magnetic head to the protective layer during recording based on the CSS system is shown in FIG. 5. The $R_{MAX}$ is the vertical distance between the highest crest and the deepest trough in the uneven rough pattern of the surface under consideration. Several kinds of samples differing in $R_{MAX}$ of the surface of the protective layer were prepared in the manner as described above, and the adhesion between the magnetic head and the surface of each sample was examined. Further, in consideration of the significant influence of humidity on adhesion, the adhesion in a humidified condition (76 to 100 %RH) was measured.

It was found that the adhesion phenomenon occurs more likely and a greater $R_{MAX}$ is required, as the humidity is higher. Consequently, the $R_{MAX}$ value necessary for the adhesion of the magnetic head to the protective layer of the magneto-optical disk to be prevented under any humidity conditions was found to be at least 1.6 μm, as seen from FIG. 5. It is preferable, however, that the $R_{MAX}$ is less than 10 μm. In this case, it is preferable that the interval of the concave patterns is at least 0.5 μm and less than 10 μm.

If the thickness of the protective layer reaches or exceeds 10 μm, a magnetic field cannot reach from the magnetic head to the recording film of the magneto-optical disk. If the interval reaches or exceeds 10 μm, the effect of the surface roughening is substantially lost. On the other hand, an interval of less than 0.5 μm has scarcely been obtained in this invention.

According to this invention, a minute concave rough pattern is provided at the surface of a substrate of a magneto-optical disk, whereby it is ensured that when recording based on the CSS system is carried out by use of an air floating magnetic head conforming to high-frequency recording in a magnetic field modulation type recording means, which is one of the methods of overwrite recording on magneto-optical disks, there is no possibility of such troubles as adhesion of the magnetic head to the surface of the disk or collision between the head and the disk substrate during the rotation of the disk substrate.

Thus, it has become possible to perform the intended recording stably and with high reliability, without spoiling the noncontact recording, reproduction and erasing characteristics, which are the characteristic features of optical recording.

What is claimed is:

1. A magneto-optical disk which has a circular disk form and which comprises a substrate, a recording medium layer provided on the substrate, at least one of the substrate and recording medium layer being provided with information pits and a guide groove, and means for substantially preventing at least one of collision and adhesion of a magnetic head with the magneto-optical disk during rotation thereof, the preventing means including a protective layer formed of at least one thin film on the medium layer and having a surface minutely roughened to have a concave rough pattern and not to substantially protrude beyond a reference level composed of the outermost flat surface portions of the protective layer, the concave rough pattern of the protective layer being different from a surface roughness of the medium layer.

2. The magneto-optical disk as set forth in claim 1, wherein the surface roughness of the protective layer is greater than a surface roughness of the magnetic head, the magnetic head having an air floating function with respect to the magneto-optical disk during rotation thereof.

3. A magneto-optical disk which has a circular disk form and which comprises a substrate, a recording medium layer provided on the substrate, at least one of the substrate and recording medium layer being provided with information pits and a guide groove, and means for substantially preventing at least one of collision and adhesion of a magnetic head with the magneto-optical disk during rotation thereof, the preventing means including a protective layer formed of at least one thin film on the medium layer and having a surface minutely roughened to have a concave rough pattern and a substantially flat surface between concave portions of the rough pattern, the concave rough pattern of the protective layer being different from a surface roughness of the medium layer.

4. A magneto-optical disk which has a circular disk form and which comprises a substrate provided with information pits and a guide groove, a recording medium layer provided on the substrate, and means for substantially preventing at least one of collision and adhesion of a magnetic head with the magneto-optical disk during rotation thereof, the preventing means including a protective layer formed of at least one thin film on the medium layer and having a surface minutely roughened to have a concave rough pattern and a substantially flat surface between concave portions of the rough pattern, wherein the surface roughness of the protective layer is at least 1.6 μm and less than 10 μm, and the interval of the concave portions is at least 0.5 μm and less than 10 μm.

5. The magneto-optical disk as set forth in claim 3, wherein the at least one thin film comprises at least one of a UV light curable resin, a thermosetting resin and an anaerobic adhesive.

6. A process for manufacturing a magneto-optical disk which comprises the steps of:

forming a minute concave pattern on a surface of a substrate serving as a mother mold so as to have a surface roughness of at least 1.6 μm and less than 10 μm with an interval of concave portions of at least 0.5 μm and less than 10 μm.

applying a UV light curable resin to the substrate and superposing a stamper member thereon, irradiating the resin with UV light to cure the resin, releasing the stamper member and the thus cured resin from the substrate having the concave pattern, thereby forming a stamper, applying UV light curable resin to the thus obtained stamper and superposing thereon a substrate having a magneto-optical recording medium layer with a surface roughness different from the surface roughness of the substrate serving as the motor mold, irradiating the resin on the stamper with UV light to cure the resin, and releasing the thus cured resin and the substrate from the stamper so as to form the magneto-optical disk when the thus cured resin as a protective layer on the magneto-optical recording medium layer and having a surface formed with concave patterns of surface roughness of the substrate serving as the mother mold, the protective layer serving to substantially prevent at least one of collision and adhesion of a magnetic head with the magneto-optical disk during rotation thereof.

7. A process for manufacturing a magneto-optical disk which comprises the steps of:

forming a minute concave pattern on a surface of a substrate serving as a mother mold so as to have a surface roughness of at least 1.6 μm and less than 10 μm with an interval of concave portions of at least 0.5 μm and less than 10 μm.

applying a UV light curable resin to the substrate and superposing a stamper member thereon, irradiating the resin with UV light to cure to resin, releasing the stamper member and the thus cured resin from the substrate having the concave pattern, thereby forming a stamper, applying at least one kind of resin to a surface of a substrate having a magneto-optical recording medium layer by revolving the substrate, the magneto-optical recording medium layer having a surface roughness different from the surface roughness of the substrate serving as the mother mold, applying a UV light curable resin to the stamper formed above and superposing thereon the substrate coated with the resin, irradiating the resin on the stamper with UV light to cure the resin; and releasing the thus cured resin and the substrate from the stamper so as to form the magneto-optical disk with the thus cured resin and having as a protective layer on the magneto-optical recording medium layer concave patterns of surface roughness of the substrate serving as the mother mold, the protective layer serving to substantially prevent at least one of collision and adhesion of a magnetic head with the magneto-optical disk during rotation thereof.

8. A magneto-optical disk which has a circular disk form and which comprises a substrate provided with information pits and a guide groove, a recording medium layer provided on the substrate, and means for substantially preventing at least one of collision and adhesion of a magnetic head with the magneto-optical disk during rotation thereof, the preventing means including a protective layer formed of at least one thin film on the medium layer and having a surface minutely roughened to have a concave rough pattern and not to substantially protrude beyond a reference level composed of the outermost surface portions of the protective layer, wherein the surface roughness of the protective layer is at least 1.6 $\mu$m and less than 10 $\mu$m, and an interval of concave portions is at least 0.5 $\mu$m and less than 10 $\mu$m.

* * * * *